US011891165B2

(12) United States Patent
Abdel Nour et al.

(10) Patent No.: US 11,891,165 B2
(45) Date of Patent: Feb. 6, 2024

(54) AIRCRAFT WITH TAIL PORTION HAVING CONVERGENT AND DIVERGENT WINGLETS AND RELATED MANUFACTURING METHOD

(71) Applicant: LEONARDO S.P.A., Rome (IT)

(72) Inventors: Pierre Abdel Nour, Samarate (IT); Matteo Pecoraro, Samarate (IT)

(73) Assignee: LEONARDO S.P.A., Rome (IT)

( * ) Notice: Subject to any disclaimer, the term of this patent is extended or adjusted under 35 U.S.C. 154(b) by 355 days.

(21) Appl. No.: 17/312,286

(22) PCT Filed: Oct. 31, 2019

(86) PCT No.: PCT/IB2019/059367
§ 371 (c)(1),
(2) Date: Jun. 9, 2021

(87) PCT Pub. No.: WO2020/128662
PCT Pub. Date: Jun. 25, 2020

(65) Prior Publication Data
US 2022/0106031 A1    Apr. 7, 2022

(30) Foreign Application Priority Data
Dec. 19, 2018   (EP) .................................... 18214252

(51) Int. Cl.
*B64C 23/06*     (2006.01)
*B64C 29/00*     (2006.01)

(52) U.S. Cl.
CPC ........ *B64C 23/069* (2017.05); *B64C 29/0033* (2013.01)

(58) Field of Classification Search
CPC ....... B64C 5/08; B64C 23/065; B64C 23/069; B64C 23/072; B64C 2027/829
See application file for complete search history.

(56) References Cited

U.S. PATENT DOCUMENTS

| 4,691,878 A | 9/1987 | Vaughan et al. |
| 5,211,538 A | 5/1993 | Seghal et al. |

(Continued)

FOREIGN PATENT DOCUMENTS

| DE | 20 2014 003490 | 9/2014 |
| EP | 1568604 | 8/2005 |

(Continued)

OTHER PUBLICATIONS

Jacobs et al., The Effect of Winglets on The Static Aerodynamic Stability Characteristics of a Representative Second Generation Jet Transport Model, National Aeronautics and Space Administration, Jul. 1976, https://ntrs.nasa.gov/api/citations/19760022079/downloads/19760022079.pdf?attachment=true (Year: 1976).*

(Continued)

*Primary Examiner* — Joshua J Michener
*Assistant Examiner* — Arfan Y. Sinaki
(74) *Attorney, Agent, or Firm* — Leason Ellis LLP

(57) ABSTRACT

An aircraft is described that comprises: a fuselage with a first axis of longitudinal extension; and a tail portion arranged at a tail end of the fuselage; the tail portion comprises two surfaces arranged in a V-shape, inclined to each other and symmetrical with respect to the first axis; each surface comprises an associated winglet arranged transversely with respect to the surface and fixed with respect to the surface.

6 Claims, 6 Drawing Sheets

(56) References Cited

U.S. PATENT DOCUMENTS

2009/0065632 A1\* 3/2009 Cazals ............... B64C 5/02
244/54
2018/0079493 A1\* 3/2018 Anderson ......... B64C 23/072

FOREIGN PATENT DOCUMENTS

EP 3296202 3/2018
WO WO-2015143093 A2 \* 9/2015 ............. B64C 11/28

OTHER PUBLICATIONS

Crenshaw K. R., Stability and Control Characteristics of the Winglet Configured KC-135A, United States Air Force Air University, Jan. 28, 1977, https://apps.dtic.mil/sti/pdfs/ADA034940.pdf (Year: 1977).\*

\* cited by examiner

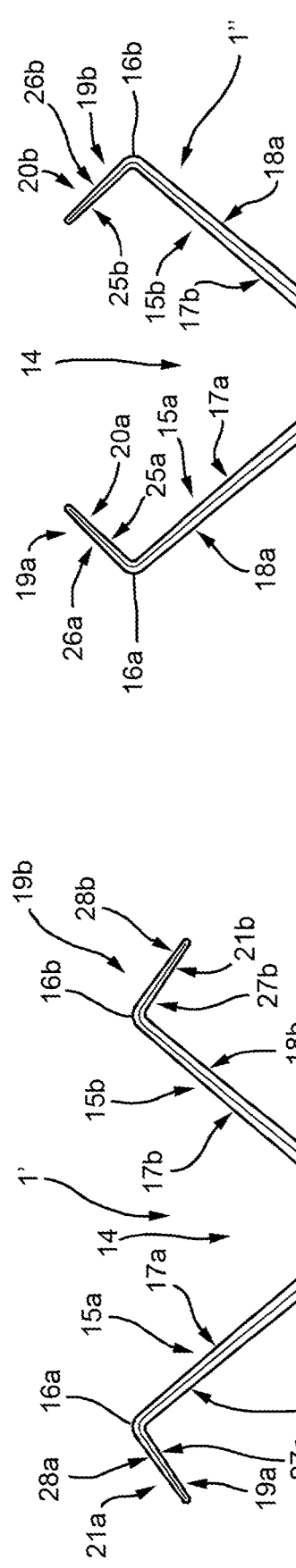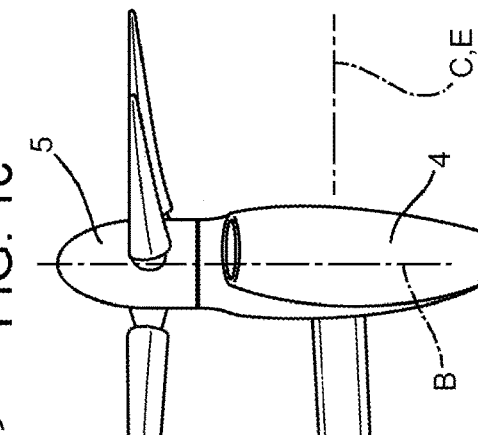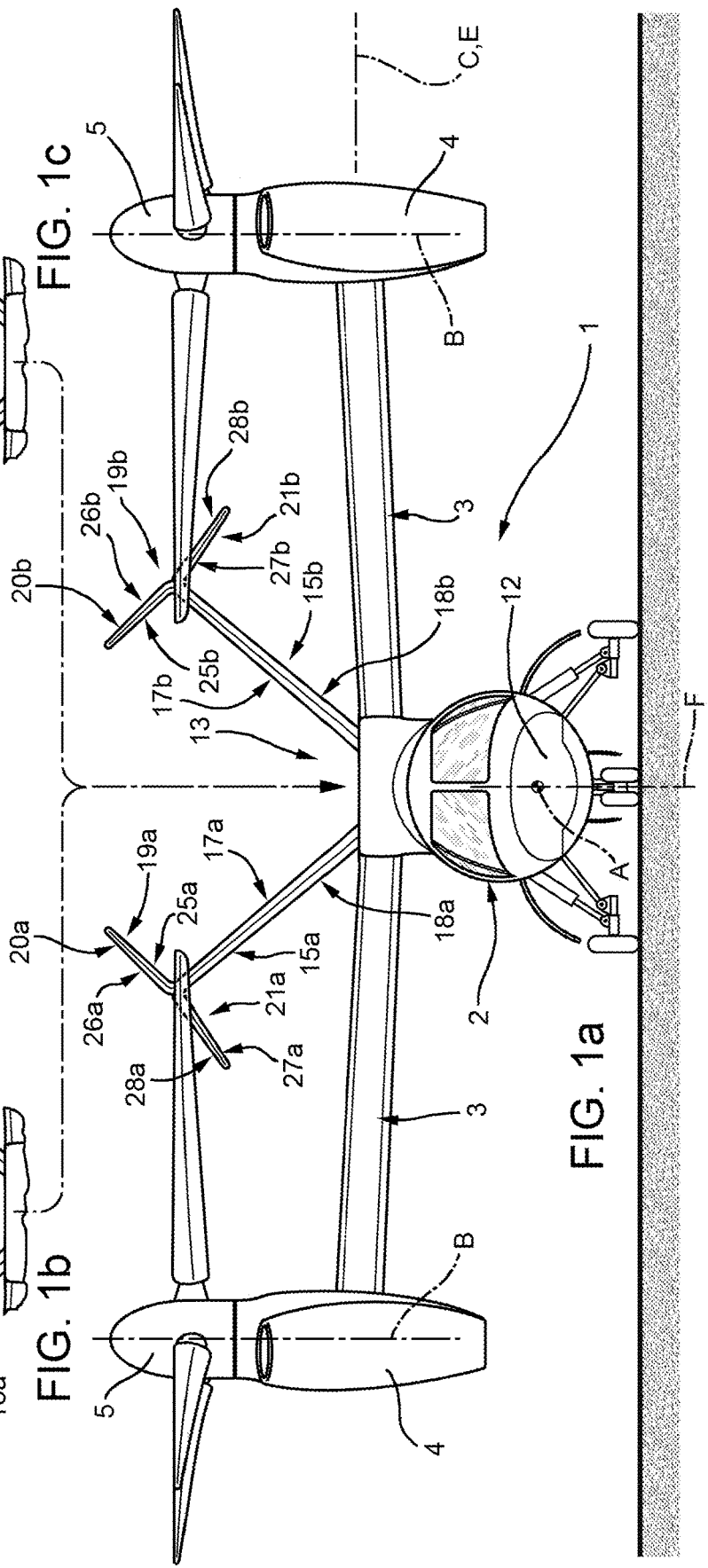

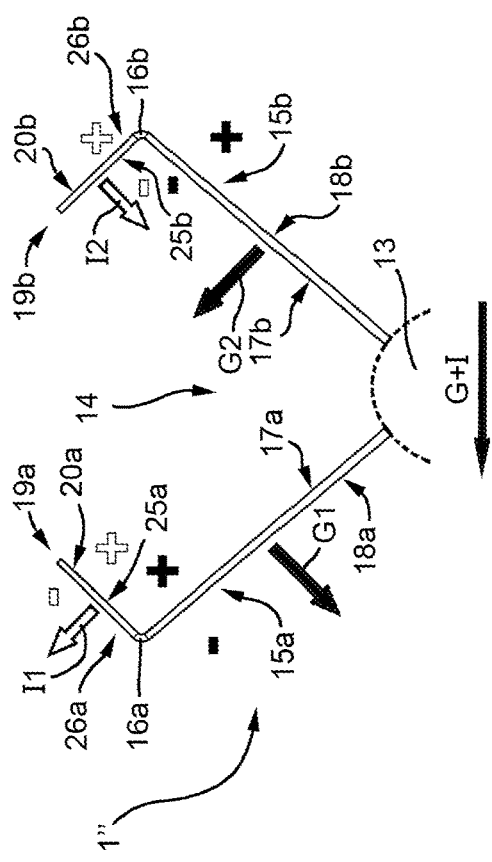
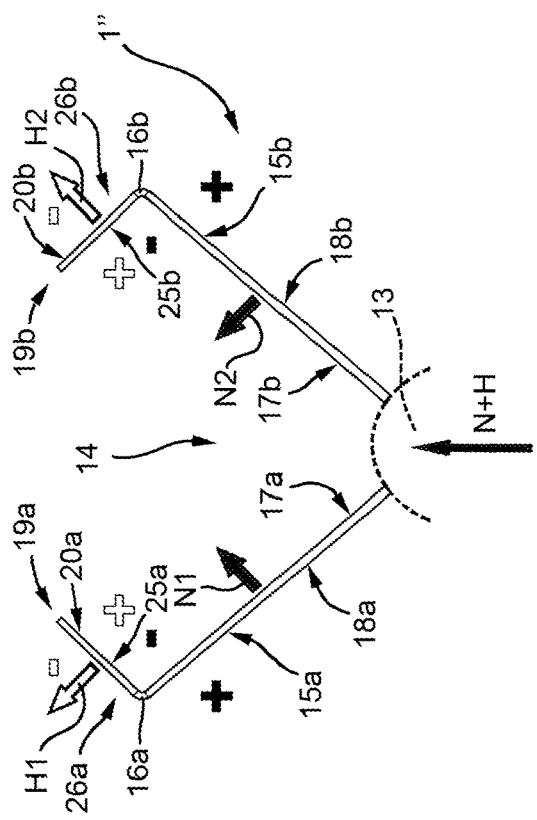
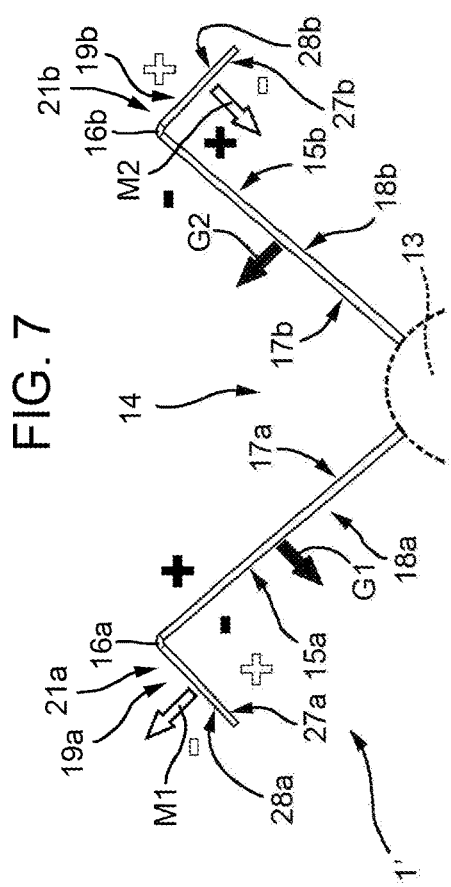
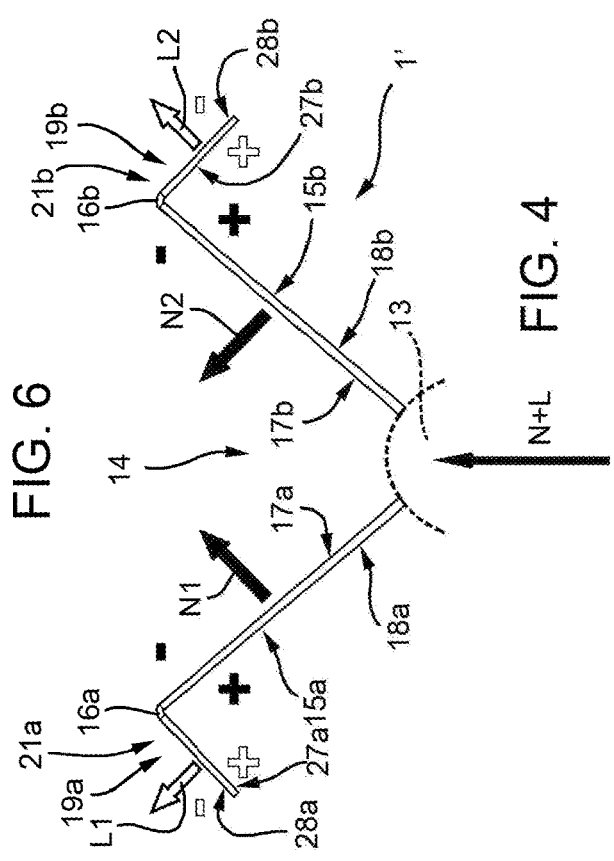
FIG. 7
FIG. 5
FIG. 6
FIG. 4

AIRCRAFT WITH TAIL PORTION HAVING CONVERGENT AND DIVERGENT WINGLETS AND RELATED MANUFACTURING METHOD

CROSS-REFERENCE TO RELATED APPLICATIONS

This patent application is a U.S. National Phase Application under 35 U.S.C. § 371 of International Patent Application No. PCT/IB2019/059367, filed on Oct. 31, 2019, which claims priority from European patent application no. 18214252.1, filed on Dec. 19, 2018, all of which are incorporated by reference, as if expressly set forth in their respective entireties herein.

TECHNICAL FIELD

The present invention relates to an aircraft and related method of manufacturing said aircraft.

In particular, the aircraft is an aeroplane, a convertiplane, a gyrodyne or an autogiro.

BACKGROUND ART

Aircraft comprise, in a known manner, a fuselage extending along a first longitudinal roll axis, two cantilever wings projecting from the fuselage and a tail fin projecting in a cantilever fashion from a tail end of the fuselage along a plane containing the first longitudinal axis and positioned vertically when the aircraft is on the ground.

It is also possible to identify a reference system centred on the aircraft's barycentre and comprising, in addition to first roll axis:
  a second pitch axis, which is orthogonal to the first roll axis and extends parallel to the line joining the tips of the wings; and
  a third yaw axis, which is orthogonal to the aforementioned first and second axes.

In the known manner, the tail fin comprises a hinged rudder, which is movable to control the aircraft's yaw.

In the above-described solution, aircraft of known type comprise a tailplane arranged on the tail portion.

The tailplane is also arranged at the tail end of the fuselage, extending from both sides of the fuselage in a cantilever fashion and lying on a horizontal plane when the aircraft is on the ground.

In the known manner, the tailplane comprises two fixed surfaces known as stabilizers, to which respective movable surfaces known as elevators are hinged.

In the known manner of flight mechanics, it is possible to define:
  an angle of attack of the aircraft, equal to the angle defined between the first roll axis and the projection of the velocity vector on the plane defined by the first roll axis and the third yaw axis; and
  a sideslip angle of the aircraft, equal to the angle defined between the velocity vector and the plane defined by the first roll axis and the third yaw axis.

A change in the aircraft's angle of attack and/or sideslip angle causes a corresponding change in the pitch angle of the wings and tailplane, with a consequent change in the generated lift forces.

Furthermore, it is possible to define the stability of an aircraft as the capacity to autonomously return to the prior attitude after the effect of a small perturbation on the aircraft passes, such as a gust of wind for example.

More specifically, if the aforementioned small perturbation causes rotation about the second pitch axis and therefore a change in the so-called angle of attack of the aircraft, the aforementioned capacity is called longitudinal static stability.

Contrariwise, the capacity to autonomously return to the prior attitude following a change in the sideslip angle is called lateral-directional stability.

An example of a small perturbation that causes a change in sideslip angle is a perturbation that generates rotation of the aircraft about the first roll axis. In these circumstances, the rotation about the roll axis generates an unbalanced weight component parallel to the second pitch axis. This component causes sideslip of the aircraft parallel to the second pitch axis and in the direction of the lower lying wing, with a consequent change in the so-called sideslip angle of the aircraft.

The stabilizers generate respective lifts that ensure the longitudinal static stability of the aircraft. Contrariwise, the elevators are movable with respect to the associated stabilizers to control the aircraft's pitch motion about the second axis.

Instead, lateral-directional stability is ensured by the fin and can be further increased with the use of dihedral wings, inclined with respect each other to form a slightly inclined V-shape with a vertex on the fuselage, with reference to a condition in which the aircraft is on the ground.

In fact, the above-described sideslip movement induces a flow of air transversal to the aircraft that will merge with the flow due to the forward flight of the aircraft. As a result of the inclination between the wings due to the (positive) dihedral angle, the resultant current that strikes the lower lying wing has a larger angle of attack than that of the opposite surface. In consequence, the lift developed by the lowered wing is greater than that developed by the other, causing a moment along the first roll axis that tends to return the aircraft to the unperturbed attitude.

According to a further known type of design solution, the tail fin and the tailplane are replaced by two control surfaces projecting from the tail end symmetrically to the first longitudinal axis of the fuselage and lying on respective planes oblique to the first axis so as to assume a V-shaped configuration, commonly known in the industry as a "V-tail".

The angle formed by each plane on which a control surface lies with a plane defined by the first roll axis and the second pitch axis is called the dihedral angle.

This design solution has been, for example, implemented in the Beech Bonanza, Fouga Magister, Predator, Eclipse 400 and Cirrus jet aircraft.

V-tail aircraft are of interest because, when compared with traditional aircraft, they have a smaller number of components and parts, less aerodynamic resistance as a result of lesser interference of the tail portion with the wash of the fuselage, and less exposure to airflows deviated downwards by the wings.

With reference to a level flight condition of the aircraft, the control surfaces generate respective lifts, each of which has a first horizontal component parallel to the second pitch axis and a second vertical component parallel to the third yaw axis.

The second vertical components provide a certain level of longitudinal stability to the aircraft, i.e. in terms of the capacity of the aircraft to autonomously return to a stable attitude in the case where a gust of wind causes rotation of the aircraft about the second pitch axis.

The lifts generated by the control surfaces provide a certain level of lateral-directional stability to the aircraft.

This is because the surfaces of the tail portion behave like two wings with a positive dihedral angle.

More specifically, following a small perturbation that induces a roll moment, the aircraft sideslips to the side of the lowered control surface.

In consequence, the lift developed by the lowered surface is greater than that developed by the other, causing a moment along the first roll axis that tends to return the aircraft to the unperturbed attitude.

For a given cruising speed, the levels of longitudinal and lateral-directional stability provided by the control surfaces are unequivocally defined by the area of the control surfaces and by the positive dihedral angle.

These characteristics are normally defined in the preliminary design stage.

There is awareness in the industry of the need to be able to increase the longitudinal and lateral-directional stability characteristics of an aircraft in a variable manner, as desired and independently of one another, without altering the dihedral angle and the size of the control surfaces.

There is also awareness in the industry of the need to be able to vary the longitudinal and lateral-directional stability characteristics of an aircraft independently of one another and in a successive stage to that of the preliminary design.

EP-A-3296202 and U.S. Pat. No. 4,691,878 illustrate the use of end tabs, commonly known as "winglets", in aircraft.

In particular, these winglets are placed at the free ends of respective wings and enable reducing the induced drag caused by tip vortices. In this way, the winglets increase the efficiency of the wings without requiring effective lengthening of the wings.

EP-A-1568604 and U.S. Pat. No. 5,211,538 illustrate the use of winglets on the respective free ends of the horizontal tailplane of a helicopter.

DE-U-202014003490 discloses an aircraft according to the preamble of claim 1 and a method of manufacturing an aircraft according to the preamble of claim 6.

DISCLOSURE OF INVENTION

The object of the present invention is the manufacture of an aircraft that enables satisfying the aforementioned needs in a simple and inexpensive manner.

The aforesaid object is achieved by the present invention, in so far as it relates to an aircraft according to claim 1.

The present invention also related to a method of manufacturing an aircraft according to claim 6.

BRIEF DESCRIPTION OF THE DRAWINGS

For a better understanding of the present invention, three preferred embodiments of the invention are described hereinafter, purely by way of non-limitative example and with reference to the accompanying drawings, in which:

FIG. 1a is a front view of a first embodiment of an aircraft, in particular a convertiplane, made according to the principles of the present invention;

FIG. 1b is a front view of certain details of a convertiplane according to a second embodiment of the present invention;

FIG. 1c is a front view of certain details of a convertiplane according to a third embodiment of the present invention;

FIGS. 4 and 5 schematically show the high-pressure and low-pressure areas and the aerodynamic forces generated on a V-tail portion and the winglets of the second embodiment of the convertiplane in FIG. 1b, in the case of increasing the aircraft's angle of attack and in the case of increasing the aircraft's sideslip angle, respectively;

FIGS. 6 and 7 schematically show the high-pressure and low-pressure areas and the aerodynamic forces generated on a V-tail portion and the winglets of the third embodiment of the convertiplane in FIG. 1c, in the case of increasing the aircraft's angle of attack and in the case of increasing the aircraft's sideslip angle, respectively;

FIG. 10 is a perspective view of a tail portion of the first embodiment of the convertiplane in FIG. 1a;

BEST MODE FOR CARRYING OUT THE INVENTION

Figure 3:
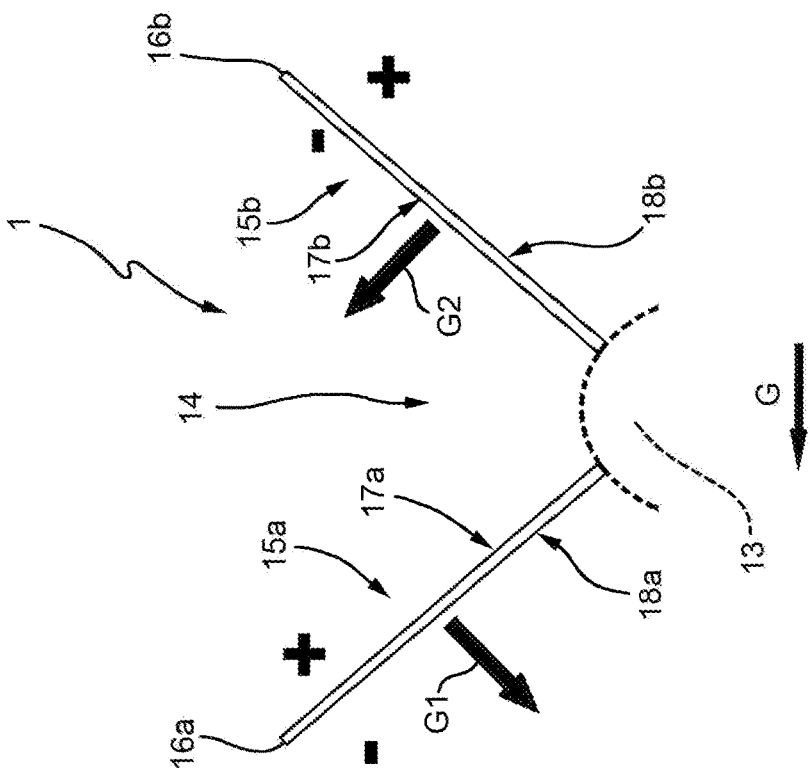
FIGS. 2 and 3 schematically show the high-pressure and low-pressure areas and the aerodynamic forces generated on a V-tail portion of each of the first, second and third embodiments of the convertiplane, in the case of increasing the aircraft's angle of attack and in the case of increasing the aircraft's sideslip angle, respectively.

Referring to FIG. 1a, reference numeral 1 indicates an aircraft, in particular a convertiplane, made according to a first embodiment of the invention.

The convertiplane 1 basically comprises:
- a fuselage 2 having axis A of longitudinal extension;
- two cantilever wings 3 projecting from respective mutually opposite sides of the fuselage 2 and transversal to axis A; and
- two nacelles 4 housing respective rotors 5.

The fuselage 2, in turn, comprises a nose 12 arranged at the front and a tail end 13, opposite to each other along axis A.

The nacelles 4 are integrally tilting with the rotors 5 about an axis C relative to the wings 3.

Axis C is transversal to axis A and to axes B.

The convertiplane 1 can be selectively arranged:
- in a "helicopter" configuration (FIG. 1a), in which the axes B of the rotors 5 are orthogonal to axis A and axis C; and
- in a "aeroplane" configuration (FIG. 13), in which the axes B of the rotors 5 are parallel to axis A and orthogonal to axis C.

Figure 13:
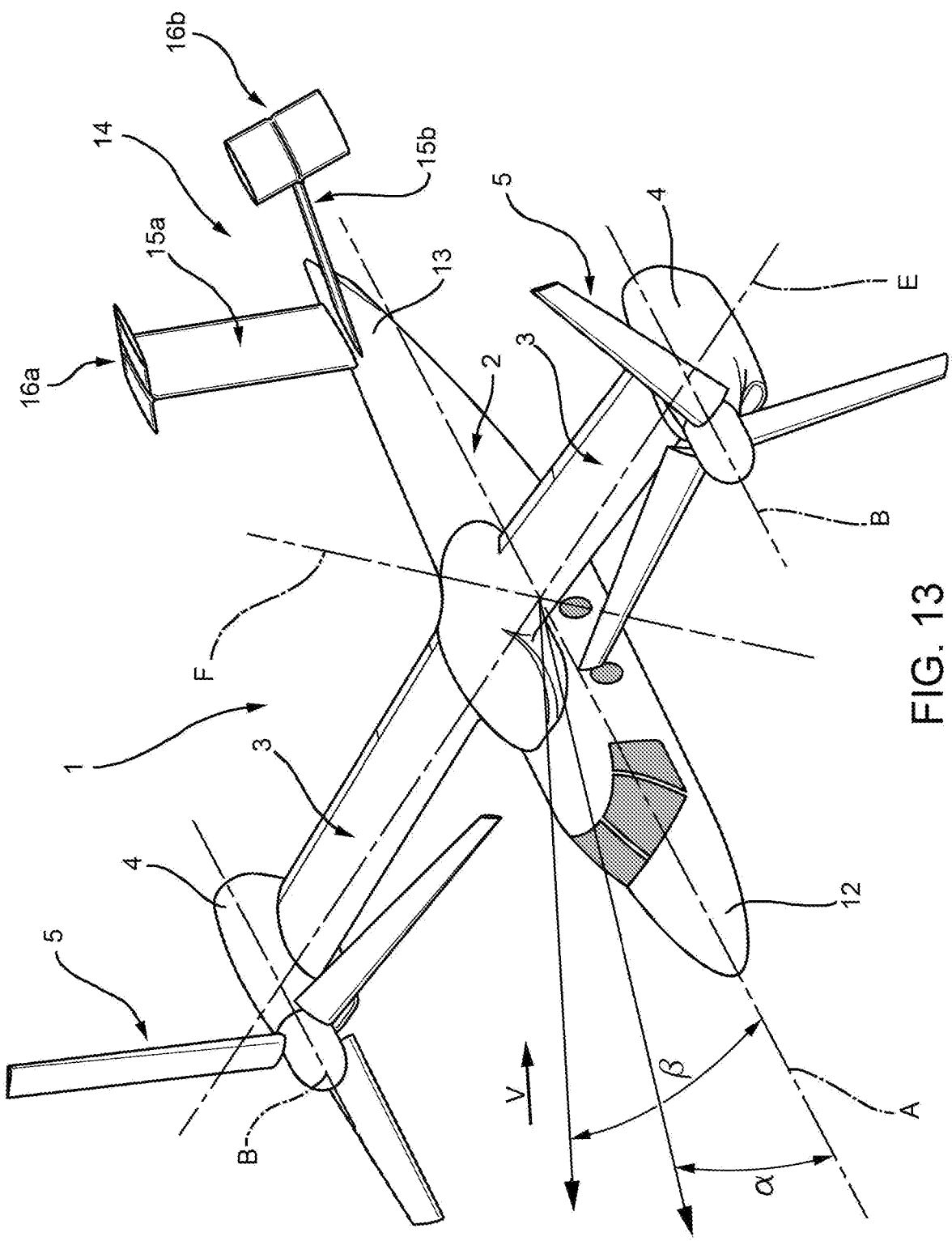
FIG. 13 is a perspective view of the first embodiment of the convertiplane in FIG. 1.

Referring to FIG. 13, it is possible to determine a reference system having its origin at the barycentre of the convertiplane 1 and formed by:
- a roll axis A, about which the convertiplane 1 rolls during roll motion;
- a pitch axis E, which is orthogonal to the roll axis A and extends parallel to the line joining the tips of the wings 3; and
- a yaw axis F, which is orthogonal to the aforementioned axes A and E.

Hereinafter in this description, the moments acting on the convertiplane 1 and directed about the axes A, E and F are identified as the "roll moment", "pitching moment" and "yaw moment", respectively.

Axes A, E and F are commonly known as the "principal axes".

Referring to FIG. 13, in every flight condition it is possible to determine an angle of attack a of the convertiplane 1, defined as the angle between:
- the orthogonal projection of the velocity vector V on the median plan of the convertiplane 1 defined by axes A and F; and
- axis A.

In any flight condition, it is also possible to determine a sideslip angle β of the convertiplane 1, defined as the angle between:
- the velocity vector V; and
- the median plan of the convertiplane 1 defined by axes A and F.

A change in the angle of attack a and/or the sideslip angle β of the convertiplane 1 induces a corresponding change in the pitch angle of the wings 3.

Furthermore, it is possible to define the stability of the convertiplane 1 as the capacity to autonomously return to the prior attitude once the effect of a small transitory in time perturbation on the convertiplane 1 passes, such as a gust of wind for example.

More specifically, if the aforementioned small perturbation causes a "pitching moment", and therefore rotation about the pitch axis E, the aforementioned capacity is called longitudinal static stability. It is important to note that the aforementioned "pitching moment" also causes an increase in the angle of attack a of the convertiplane 1.

Contrariwise, the capacity to return to the prior attitude following a change in the sideslip angle β is called lateral-directional stability.

For example, a change in the sideslip angle β occurs every time a perturbation causes a roll moment acting about the roll axis A.

Referring to FIGS. 1a, 8, 9, 10 and 13, the convertiplane 1 further comprises a tail portion 14 arranged at the tail end 13 of the fuselage 2.

This tail portion 14 comprises two surfaces 15a and 15b arranged symmetrically with respect to axis A and forming a V-shape.

Starting from the fuselage 2, surfaces 15a and 15b diverge from one another.

In the case shown, the surfaces 15a and 15b diverge from one another from the side of the fuselage 2 where the rotors 5 are located when the convertiplane 1 is in the "helicopter" configuration.

Surfaces 15a and 15b comprise respective end edges 16a and 16b, opposite to the fuselage 2.

Surfaces 15a and 15b define respective faces 17a and 17b, facing each other and arranged on the side of axis A, and respective faces 18a and 18b opposite to the corresponding faces 17a and 17b.

Following forward motion of the convertiplane 1, surfaces 15a and 15b generate respective lift forces orthogonal to the median planes on which surfaces 15a and 15b lie.

Each surface 15a and 15b comprises a respective winglet 19a and 19b arranged transversely to the associated surface 15a and 15b and mounted in a fixed manner with respect to the associated surface 15a and 15b.

In greater detail, the winglets 19a and 19b extend symmetrically with respect to the median plan of the fuselage 2 defined by axes A and F.

Preferably, the winglets 19a and 19b are flat.

Figure 10:
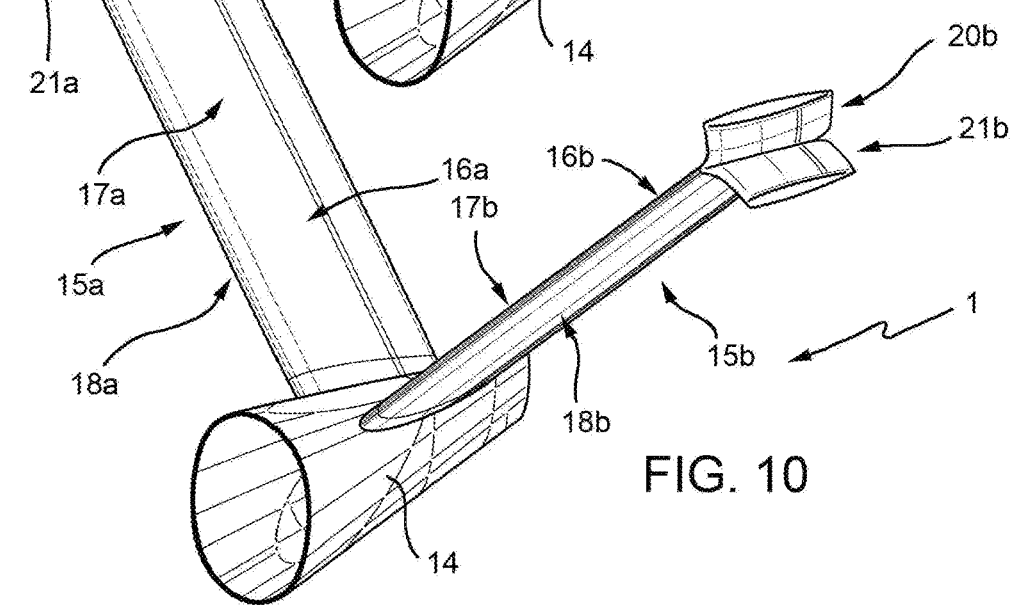

In the first embodiment of the convertiplane 1 shown in FIGS. 1a and 10, each winglet 19a and 19b comprises:
- a respective section 20a and 20b, which extends from the respective edge 16a and 16b on the side of the respective face 17a and 17b; and
- a respective section 21a and 21b, which extends from the respective edge 16a and 16b on the side of the respective face 18a and 18b.

Sections 20a and 20b comprise:
- respective faces 25a and 25b contiguous with respective faces 17a and 17b of surface 15a and 15b; and
- respective faces 26a and 26b opposite to the corresponding faces 25a and 25b.

Sections 21a and 21b comprise:
- respective faces 27a and 27b contiguous with respective faces 18a and 18b, and
- respective faces 28a and 28b opposite to the corresponding faces 27a and 27b.

In the case shown, the winglets 19a and 19b and the associated surfaces 15a and 15b define respective angles at edges 16a and 16b ranging between 80 and 100 degrees, preferably 90 degrees.

It is important to point out that the aforementioned angles are the angles between the planes tangential to the winglets 19a and 19b and to the associated surfaces 15a and 15b at the respective edges 16a and 16b.

In addition, the winglets 19a and 19b are parallel to surfaces 15b and 15a opposite to them.

In the case shown, the mean planes on which surfaces 15a and 15b lie are inclined at 90 degrees to each other and have a larger area than the respective winglets 19a and 19b.

Referring to FIGS. 1b, 4, 5 and 11, reference numeral 1' indicates a convertiplane according to a further embodiment of the present invention.

Convertiplane 1' is similar to convertiplane 1 and will be described hereinafter only with regard to the differences; where possible, the same or corresponding parts of convertiplanes 1 and 1' will be indicated with the same reference numerals.

In particular, convertiplane 1' differs from convertiplane 1 in that the winglets 19a and 19b extend from edges 16a and 16b only on the side of the respective faces 18a and 18b.

In other words, each winglet 19a or 19b extends from edge 16a or 16b of the respective surface 15a or 15b on the side facing away from the edge 16b or 16a of the other surface 15b or 15a.

More specifically, the winglets 19a and 19b comprise only sections 21a and 21b.

Referring to FIGS. 1c, 6, 7 and 12 reference numeral 1" indicates a convertiplane according to a further embodiment of the present invention.

Convertiplane 1" is similar to convertiplane 1 and will be described hereinafter only with regard to the differences; where possible, the same or corresponding parts of convertiplanes 1 and 1" will be indicated with the same reference numerals.

In particular, convertiplane 1" differs from convertiplane 1 in that the winglets 19a and 19b extend from edges 16a and 16b only on the side of the respective face 17a and 17b.

In other words, each winglet 19a or 19b extends from edge 16a or 16b of the respective surface 15a or 15b on the side facing towards edge 16b or 16a of the other surface 15b or 15a. More specifically, the winglets 19a and 19b comprise only sections 20a and 20b.

In use, convertiplane 1 takes off and lands in the "helicopter" configuration and moves in forward flight, at high speed and altitudes, in the "aeroplane" configuration.

Convertiplane 1 can be selectively arranged:

in a "helicopter" configuration (FIG. 1a), in which the axes B of the rotors 5 are orthogonal to axis A and to axis C; and in an "aeroplane" configuration (FIG. 13), in which the axes B of the rotors 5 are parallel to axis A and orthogonal to axis C.

Referring to the "aeroplane" configuration, surfaces 15a and 15b of the tail portion 14 and the winglets 19a and 19b provide the necessary level of longitudinal static stability and lateral-directional stability.

It is important to stress that surfaces 15a and 15b and the winglets 19a and 19b are shown as being flat in FIGS. 4 to 9 only for simplicity.

In reality, surfaces 15a and 15b and the winglets 19a and 19b have wing profiles with a high-pressure face (indicated with the + sign) and a low-pressure face (indicated with the − sign). These wing profiles generate a lift force in the known manner directed from the low-pressure face towards the high-pressure face.

It is important to stress that if the high pressure areas (indicated with the + sign), and consequently the low pressure areas (indicated with the − sign), of the surfaces 15a and 15b and the winglets 19a and 19b are adjacent to one another, constructive interference is generated between these high-pressure/low-pressure areas (FIGS. 4 and 7). This constructive interference does not substantially alter the values of the forces N1, N2; G1, G2, G; L1, L2; M1, M2; H1, H2; I1, I2 generated by surfaces 15a and 15b and the winglets 19a and 19b.

Contrariwise, if each high-pressure area (indicated with the + sign) of surfaces 15a and 15b and the winglets 19a and 19b is adjacent to a respective low-pressure area (indicated with the − sign), destructive interference is generated between these high-pressure areas and the respective low-pressure areas adjacent to them (FIGS. 5 and 6). This destructive interference reduces the values of the forces G1, G2; N1, N2 generated by surfaces 15a and 15b.

It is also important to stress that, in FIGS. 4 to 9, the high-pressure and low-pressure conditions, like the forces N1, N2, N; G1, G2, G; L1, L2, L; M1, M2, M; H1, H2, H; I1, I2, I, should be considered as additional high-pressures/low-pressures and forces with respect to the pressure and force values acting on surfaces 15a and 15b and the winglets 19a and 19b when the convertiplane 1, 1', 1" is in unperturbed flight conditions.

The functioning of surfaces 15a and 15b is described hereinafter starting from a state in which the convertiplane is in a level flight condition with zero angle of attack a and zero sideslip angle β.

Figure 2:
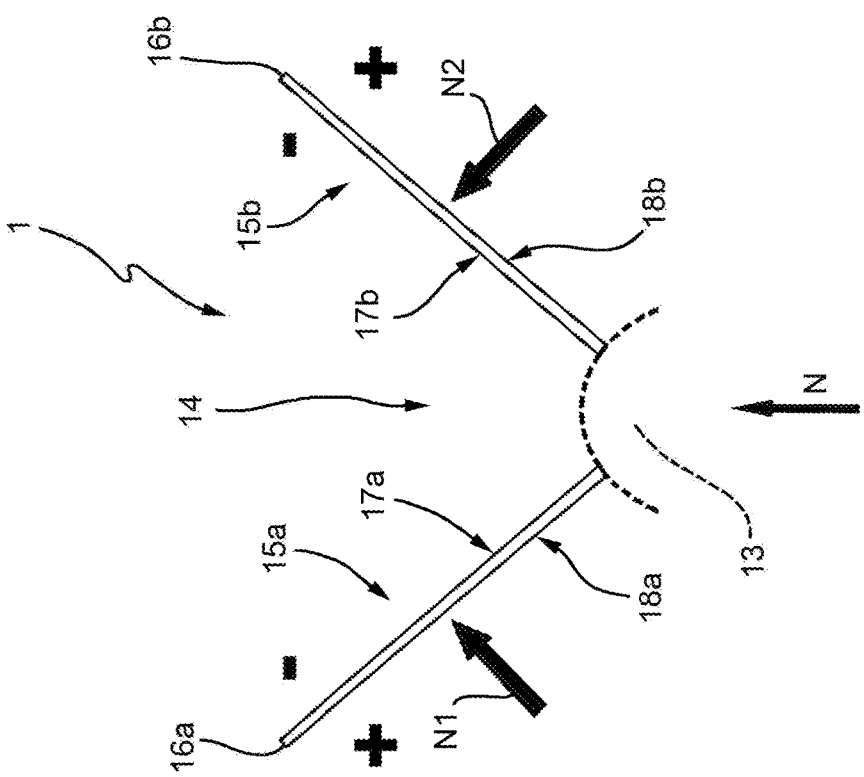

Referring to FIGS. 2 and 3, the functioning of just surfaces 15a and 15b is shown, without the use of the winglets 19a and 19b.

More specifically, referring to FIG. 2, in the case where the perturbation causes an increase in the angle of attack a of the convertiplane 1, 1', 1", i.e. the raising of the nose 12 of the convertiplane 1, 1', 1" with respect to the tail portion 14, faces 18a and 18b are subjected to high-pressure while faces 17a and 17b are subjected to low pressure.

This is because the increase in the angle of attack a of the convertiplane 1, 1', 1" causes a similar increase in the pitch angle of surfaces 15a and 15b.

Therefore, surfaces 15a and 15b develop lift forces N1 and N2 directed from faces 17a and 17b towards faces 18a and 18b. The resultant N of forces N1 and N2 is substantially parallel to axis F and applied on surfaces 15a and 15b. This resultant N generates a corrective moment about the pitch axis E that returns the convertiplane 1 to the level flight condition.

Referring to FIG. 3, in the case where the perturbation causes an increase in the sideslip angle β of the convertiplane 1, 1', 1", this results in a change in the pitch angle of surfaces 15a and 15b.

This change causes:

high-pressure on face 17a and low pressure on face 18a, as far as surface 15a is concerned; and high-pressure on face 18b and low pressure on face 17b, as far as surface 15b is concerned.

It follows that surface 15a generates lift G1 directed from face 17a to face 18a, and surface 15b generates lift G2 directed from surface 18b to face 17b.

The resultant of lifts G1 and G2 is a force G parallel to axis E and generating a yaw moment about axis F on the convertiplane 1 that reduces the sideslip angle β and returns the convertiplane 1, 1', 1" to the undisturbed flight condition with a substantially zero sideslip angle β.

Referring to FIGS. 4 and 5, the functioning of the tail portion 14 of the convertiplane 1' is shown according to the second embodiment of the invention.

According to this embodiment, the winglets 19a and 19b only comprise the respective sections 21a and 21b.

More specifically, referring to FIG. 4, in the case where the perturbation causes an increase in the angle of attack a of the convertiplane 1', i.e. the raising of the nose 12 of the convertiplane 1' with respect to the tail portion 14, faces 27a and 27b are subjected to high-pressure while the faces 28a and 28b are subjected to low pressure.

Constructive interference is thus generated between the high-pressure and low-pressure areas acting on surfaces 15a and 15b and on sections 21a and 21b of the winglets 19a and 19b.

These high pressures and low pressures derive from an increase in the pitch angle of the winglets 19a and 19b, deriving from the increase in the angle of attack a of the convertiplane 1'.

Therefore, in addition to the forces N1 and N2 generated by surfaces 15a and 15b (FIG. 2), the tail portion 14 also develops forces L1 and L2 generated by the winglets 19a and 19b. These forces L1 and L2 have a resultant L substantially parallel to axis F, which is points in the same direction as and is summed to the resultant N of forces N1 and N2. This increase in the resultant N+L applied to the tail portion 14 increases the corrective moment about the pitch axis E, which returns the convertiplane 1' to the level flight condition.

In other words, the presence of the winglets 19a and 19b increases the level of longitudinal stability of the convertiplane 1'.

Referring to FIG. 5, in the case where the perturbation causes an increase in the sideslip angle β of the convertiplane, this results in a change in the pitch angle of surfaces 15a and 15b and the winglets 19a and 19b.

In addition to that shown in FIG. 3, this change causes:

high-pressure on face 27a and low pressure on face 28a, as far as winglet 19a is concerned; and high-pressure on face 28b and low pressure on face 27b as far as winglet 19b is concerned.

It follows that winglet 19a generates lift M1 directed from surface 27a to surface 28a, and winglet 19b generates lift M2 directed from surface 28b to surface 27b.

Destructive interference is thus generated between the high-pressure areas and the low-pressure areas acting on surfaces 15a and 15b and on sections 21a and 21b of the winglets 19a and 19b. This causes a reduction in the forces G1 and G2 with respect to the condition in FIG. 2.

The resultant of lifts M1 and M2 is a force M parallel to axis E that is summed to the reduced resultant G of forces G1 and G2 and generates a yaw moment about axis F on the convertiplane 1', which reduces the sideslip angle β and returns the convertiplane 1' to the undisturbed flight condition with a substantially zero sideslip angle β.

Since the forces G1 and G2 are reduced with respect to the condition in FIG. 2 due to the above-mentioned destructive interference, the presence of the winglets 19a and 19b does not substantially alter the level of lateral-directional stability of the convertiplane 1'.

In other words, the resultant G+M in the configuration in FIG. 5 is substantially equal to the resultant G in the configuration in FIG. 3.

Referring to FIGS. 6 and 7, the functioning of the tail portion 14 of the convertiplane 1" is shown according to the third embodiment of the invention.

According to this embodiment, the winglets 19a and 19b only comprise the respective sections 20a and 20b.

More specifically, referring to FIG. 6, in the case where the perturbation causes an increase in the angle of attack a of the convertiplane 1", i.e. the raising of the nose 12 of the convertiplane 1" with respect to the tail portion 14, faces 25a and 25b are subjected to high-pressure while faces 26a and 26b are subjected to low pressure.

These high pressures and low pressures derive from an increase in the pitch angle of the winglets 19a and 19b deriving from the increase in the angle of attack a of the convertiplane 1".

Destructive interference is thus generated between the high-pressure and low-pressure areas acting on surfaces 15a and 15b and on sections 20a and 20b of the winglets 19a and 19b. This causes a reduction in the forces N1 and N2 with respect to the condition in FIG. 2.

Furthermore, in addition to the forces N1 and N2 generated by surfaces 15a and 15b (FIG. 2), the tail portion 14 also develops forces H1 and H2, generated by the winglets 19a and 19b. These forces H1 and H2 have a resultant H substantially parallel to axis F, which is summed to the reduced resultant N of forces N1 and N2. This increase in the resultant applied to the tail portion 14 increases the corrective moment about the pitch axis E, which returns the convertiplane 1" to the level flight condition.

Since forces N1 and N2 are reduced with respect to the condition in FIG. 2 due to the above-mentioned destructive interference, the presence of the winglets 19a and 19b does not substantially alter the level of longitudinal stability of the convertiplane 1".

In other words, the resultant N+H in the configuration in FIG. 6 is substantially equal to the resultant N in the configuration in FIG. 2.

Referring to FIG. 7, in the case where the perturbation causes an increase in the sideslip angle β of the convertiplane, this results in a change in the pitch angle of surfaces 15a and 15b and the winglets 19a and 19b.

In addition to that shown in FIG. 3, this change causes:
high-pressure on face 25a and low pressure on face 26a, as far as winglet 19a is concerned; and
high-pressure on face 26b and low pressure on face 25b as far as winglet 19b is concerned.

It follows that winglet 19a generates lift I1 directed from surface 25a to surface 26a, and winglet 19b generates lift I2 directed from surface 26b to surface 25b.

The resultant of lifts I1 and I2 is a force I parallel to axis E. This resultant I is a force parallel to the axis that is summed to the resultant G of forces G1 and G2 and generates a yaw moment about axis F on the convertiplane 1", which reduces the sideslip angle β and returns the convertiplane 1" to the undisturbed flight condition with a substantially zero sideslip angle β.

In other words, the presence of the winglets 19a and 19b increases the level of lateral-directional stability of the convertiplane 1".

Figure 9:
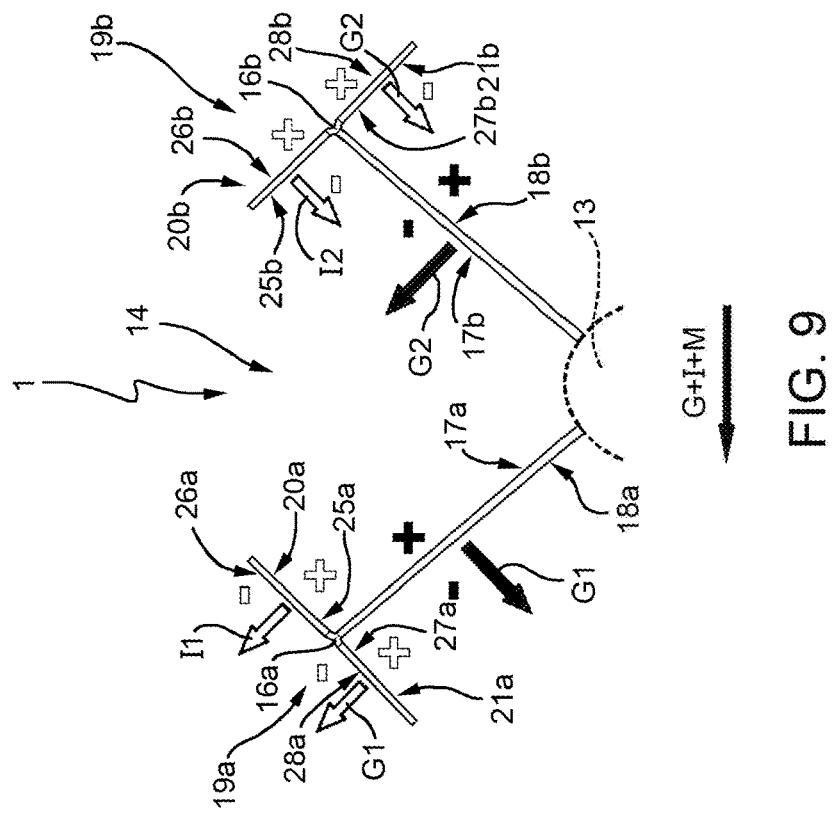
FIGS. 8 and 9 schematically show the high-pressure and low-pressure areas and the aerodynamic forces generated on a V-tail portion and the winglets of the first embodiment of the convertiplane in FIG. 1a, in the case of increasing the aircraft's angle of attack and in the case of increasing the aircraft's sideslip angle, respectively.
Figure 8:
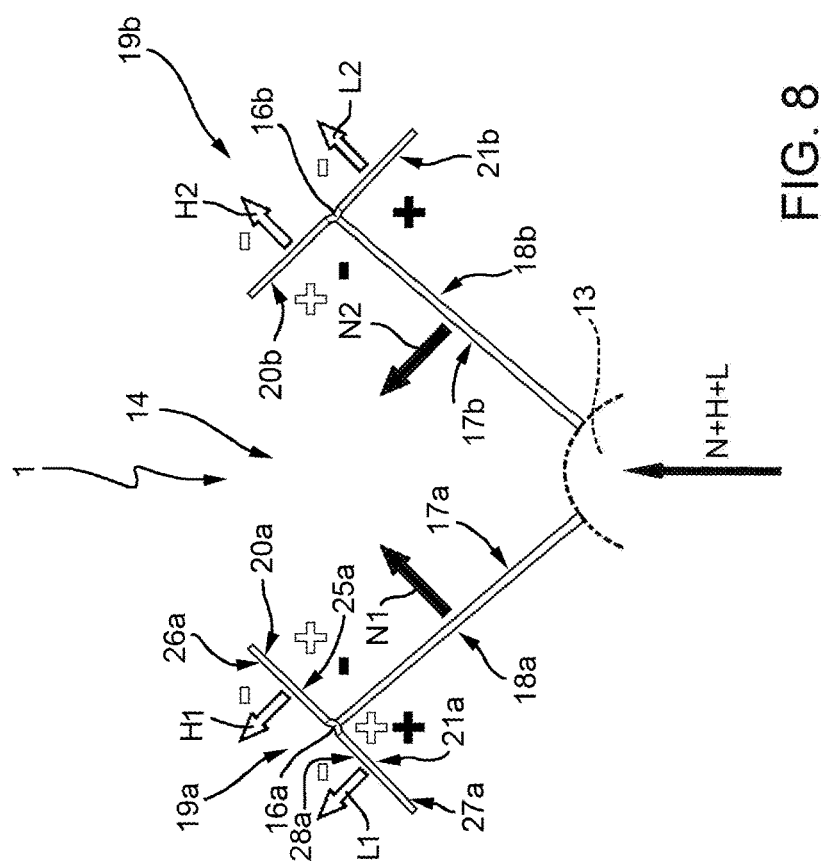
Figure 11:
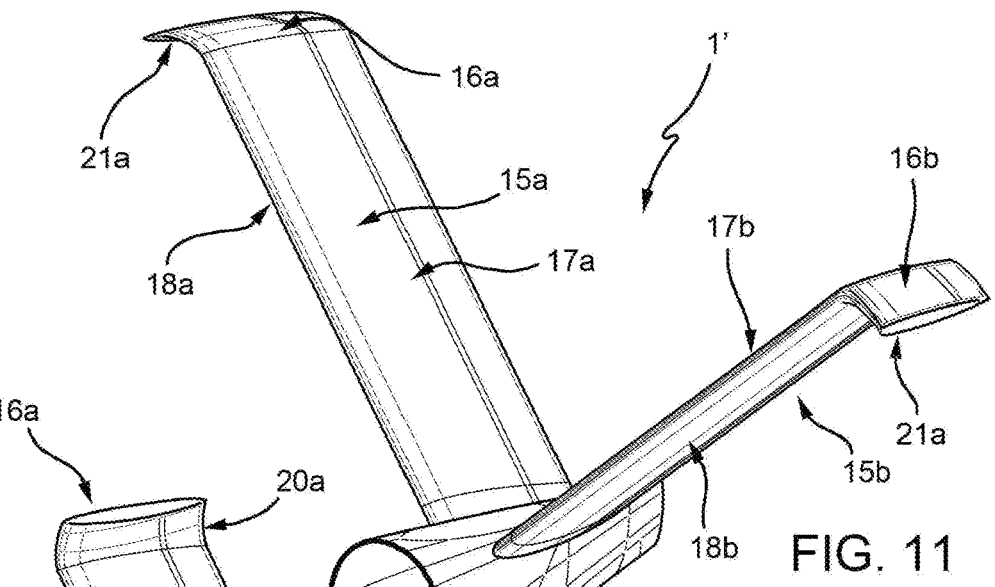
FIG. 11 is a perspective view of a tail portion of the second embodiment of the convertiplane in FIG. 1b.
Figure 12:
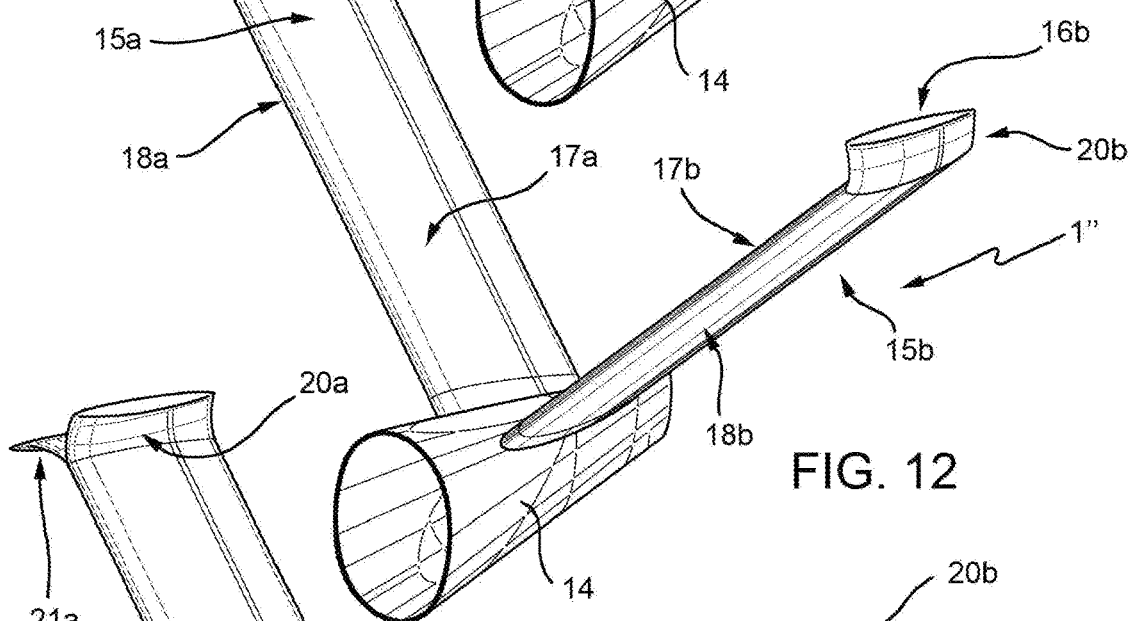
FIG. 12 is a perspective view of a tail portion of the third embodiment of the convertiplane in FIG. 1c.

Referring to FIGS. 8 and 9, the functioning of the tail portion 14 of the convertiplane 1 is shown according to the first embodiment of the invention.

According to this embodiment, the winglets 19a and 19b comprise both respective sections 20a and 20b and respective sections 21a and 21b.

More specifically, referring to FIG. 8, in the case where the perturbation causes an increase in the angle of attack a of the convertiplane 1, i.e. the raising of the nose 12 of the convertiplane 1 with respect to the tail portion 14, the previously described forces H1, H2, L1 and L2 are generated in addition to and in the same directions as forces N1 and N2.

Therefore, an overall resultant N+H+L is generated parallel to axis F, with a consequent further increase in the stabilizing corrective moment about the pitch axis E that returns the convertiplane 1 to the level flight condition.

Referring to FIG. 9, in the case where the perturbation causes an increase in the sideslip angle β of the convertiplane, the previously described forces I1, I2, M1 and M2 are generated in addition to forces G1 and G2.

Therefore, an overall resultant G+I+M is generated parallel to axis E, with a consequent further increase in the stabilizing yaw moment about axis F on the convertiplane 1, which reduces the sideslip angle β and returns the convertiplane 1 to the undisturbed flight condition with a substantially zero sideslip angle β.

From examination of the convertiplane 1, 1', 1" and the method according to the present invention, the advantages that can be attained therewith are evident.

In particular, the winglets 19a and 19b applied on surfaces 15a and 15b of the tail portion 14 enable increasing the longitudinal stability and lateral-directional stability of the convertiplane 1.

In other words, the winglets 19a and 19b enable autonomously and stably returning the convertiplane 1, 1', 1" to its original attitude in the event of perturbations, due to gusts of wind for example, which cause a change in the angle of attack a and sideslip angle β of the convertiplane 1.

This increase in longitudinal and lateral-directional stability takes place in a manner that can be modulated as desired, i.e. it is possible to obtain increments in the levels of longitudinal and lateral-directional stability by amounts that are independent of each other and can be varied as desired.

It is important to stress that the increase in longitudinal and lateral-directional stability has nothing to do with the reduction in induced drag obtained in a known manner through the application of winglets to the tip portions of respective wings.

Furthermore, the winglets 19a and 19b enable changing the values of longitudinal and lateral-directional stability independently of the dihedral angle and of the extension of surfaces 15a and 15b of the tail portion 14.

It is thus possible to size the surfaces 15a and 15b with a preliminary longitudinal and lateral-directional stability value in a preliminary design stage, and size the winglets 19a and 19b only at a later stage in cases where it becomes necessary to change this value.

Finally, because the winglets 19a and 19b are respectively parallel to the surfaces 15b and 15a opposite to them, the effects of negative aerodynamic interference between these winglets 19a and 19b and surfaces 15b and 15a are reduced. This enables raising the overall value of the forces L1, L2; M1, M2; H1, H2; I1, I2 generated by the winglets 19a and 19b, with an evident improvement in the longitudinal and lateral-directional stability of the convertiplane 1, 1', 1".

The above advantage is further strengthened when the angle between each winglet 19a or 19b and the associate surface 15a or 15b is equal to or close to ninety degrees.

Finally, it is clear that modifications and variants can be made to the convertiplane 1, 1', 1" and to the related method of manufacturing set forth herein without departing from the scope defined in the claims.

In particular, instead of being a convertiplane, the aircraft could be a helicopter, an aeroplane or a gyrodyne.

The invention claimed is:

1. An aircraft (1, 1', 1") comprising:
   a fuselage (2) with an axis (A) of longitudinal extension; and
   a tail portion (14) arranged at a tail end (13) of said fuselage (2); said tail portion (14) comprising two surfaces (15a, 15b) arranged in a V-shape, inclined with respect to each other and symmetrical with respect to said axis (A); each said surface (15a, 15b) comprising an associated winglet (19a, 19b) arranged transversally with respect to the associated said surface (15a, 15b) and fixed with respect to the associated said surface (15a, 15b); said first and second surfaces (15a, 15b) comprising:
   respective first faces (17a, 17b) facing each other;
   respective second faces (18a, 18b) opposite to the respective first faces (17a, 17b); and
   respective end edges (16a, 16b) opposite to said fuselage (2) from which the associated said winglets (19a, 19b) extend; each said winglet (19a, 19b) comprising:
   a respective first portion (20a, 20b) extending in a cantilevered way from the associated end edge (16a, 16b) on a side of said respective first face (17a, 17b); starting from the associated said end edge (16a, 16b), said first portions (20a, 20b) being convergent to one another;
   wherein each said winglet (19a, 19b) further comprises a respective second portion (21a, 21b) extending in a cantilevered way from the associated end edge (16a, 16b) on a side of said respective said second face (18a, 18b);
   starting from the associated said end edge (16a, 16b), said second portions (21a, 21b) being divergent from one another;
   wherein a median plane of each said winglet (19a, 19b) is parallel to a median plane of each said surface (15b, 15a) from which the other said winglet (19b, 19a) extends.

2. The aircraft according to claim 1, wherein said winglets (19a, 19b) extend symmetrically with respect to a median plan of said fuselage (2).

3. The aircraft according to claim 1, wherein each said winglet (19a, 19b) defines an angle ranging between 80 and 100 degrees with the respective said surface (15a, 15b) at the respective said end edge (16a, 16b).

4. The aircraft according to claim 1, wherein the aircraft is a convertiplane.

5. The aircraft according to claim 1, wherein each said winglet (19a, 19b) defines an angle of 90 degrees with the respective said surface (15a, 15b) at the respective said end edge (16a, 16b).

6. A method of manufacturing an aircraft (1), the method comprises the steps of:
   i) making a fuselage (2) with an axis (A) of longitudinal extension;
   ii) arranging two mutually inclined surfaces (15a, 15b) symmetrically to said axis (A) so as to form a V-shape on a tail end (13) of said fuselage (2); and
   iii) forming an angle between said surfaces (15a, 15b) so as to confer said aircraft (1) with a preliminary value of longitudinal static stability and lateral-directional stability;
   said surfaces (15a, 15b) comprising respective end edges (16a, 16b) opposite to said fuselage (2);
   iv) making two winglets (19a, 19b), which are arranged transversely to the respective said surfaces (15a, 15b), fixed with respect to said respective surfaces (15a, 15b) and extending from respective end edges (16a, 16b) of the respective said surfaces (15a, 15b); and
   v) determining the area of said winglets (19a, 19b) and the inclination of said winglets (19a, 19b) with respect to the respective said surfaces (15a, 15b) based on a corrective value of said preliminary value of the longitudinal static stability and the lateral-directional stability;
   said steps iv) and v) being carried out after said steps i), ii) and iii);
   said first and second surfaces (15a, 15b) comprising:
   respective first faces (17a, 17b) facing each other;
   respective second faces (18a, 18b) opposite to the respective first faces (17a, 17b); and
   said winglets (19a, 19b) extending from said respective end edges (16a, 16b);
   each said winglet (19a, 19b) comprising:
   a respective first portion (20a, 20b) extending in a cantilevered way from the associated end edge (16a, 16b) on the side of said respective first face (17a, 17b);
   starting from the associated said end edge (16a, 16b), said first portions (20a, 20b) being convergent to one another;
   each said winglet (19a, 19b) further comprises a respective second portion (21a, 21b) extending in a cantilevered way from the associated end edge (16a, 16b) on the side of said respective said second face (18a, 18b);
   starting from the associated said end edge (16a, 16b), said second portions (21a, 21b) being divergent from one another.

* * * * *